March 29, 1966  H. MIRTAIN  3,242,965
PNEUMATIC CASING
Filed Jan. 13, 1964
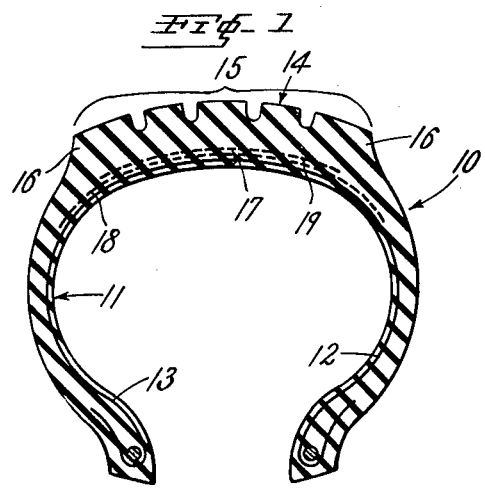
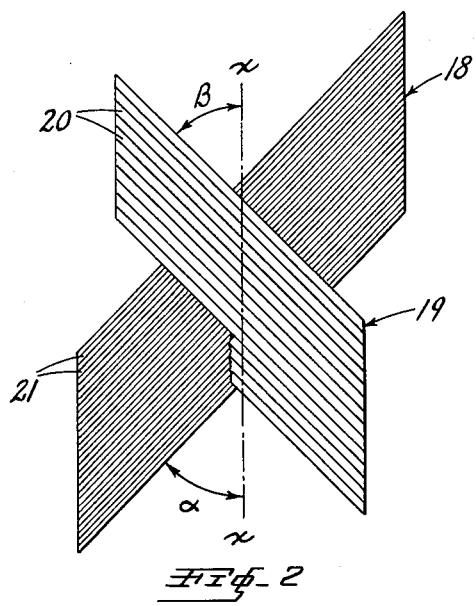
INVENTOR
HENRI MIRTAIN
BY Harvey E Bumgardner Jr
ATTORNEY United States Patent Office 3,242,965
Patented Mar. 29, 1966

3,242,965
PNEUMATIC CASING
Henri Mirtain, Compiegne, France, assignor to Societe Francaise du Pneu Englebert, Margny-les-Compiegne, France, a corporation of France
Filed Jan. 13, 1964, Ser. No. 337,275
12 Claims. (Cl. 152—361)

This invention relates to pneumatic tires for vehicles. More particularly, it relates to tires of the so-called radial type having the type of novel breaker construction described and claimed herein.

The expression, "radial tires," as commonly used in the pneumatic tire art, may be said to include various tire constructions having one or more body plies of weftless fabric extending from bead to bead wherein the cords in each ply are substantially radial in orientation, that is, the cords are oriented substantially normal to the beads and crown centerline of the tire. In monoply radial tire construction the cords will normally have a ninety degree bias angle, that is, in the unformed carcass they will run perpendicular to the planes of the beads. In a two-ply radial tire construction the cords in each body ply will normally be oriented at oppositely disposed small angles of up to ten degrees with respect to truly normal orientation, in which case the respective body plies would be said to have oppositely disposed bias angles of eighty degrees or greater. In four-ply or heavier radial tire construction similar opposed orientation of the cords in successive body plies would be employed. All of said body or carcass constructions are contemplated within the scope of this invention and the expression "substantially radially oriented" as used herein.

In all radial tire constructions good design requires the interposition in the tread region of the tire, of a breaker comprised of one or more breaker plies of fabric, usually weftless, between the body plies or carcass and the tread. The cords of the breaker plies are either truly circumferential in orientation, that is, they have a zero degree bias angle, or they have a relatively low bias angle within the range of breaker ply bias angles commonly used for radial tires. Such low bias angle breakers as well as zero degree bias angle breakers are contemplated as being within the meaning of the expression "substantially circumferentially oriented" as applied to breaker ply cords or wires herein.

Breakers comprised of tough metallic wires are believed to have superior in-service impact and blow-out resistance, all other factors being equal. However, such wire breakers are generally less flexible and yielding than the usual non-metallic tire cord breakers, and this factor is believed to have been at least partially causative of the tendency of wire breaker tires to fail by separation of the breaker from the carcass in the tread shoulder region of the tire. The widths of the breaker plies relative to the width of the road contacting surface of the tread also appears to affect the tendency of wire breakers to separate from the carcass.

In accordance with the present invention, it has been found that an improved radial tire construction can be achieved by using a breaker comprised of at least one ply of relatively inflexible strands, generally metal wires, disposed adjacent the tread and at least one ply of relatively more flexible strands, generally non-metallic tire cords, interposed between said relatively inflexible wires and the carcass. The improvement in the construction of the tire is further enhanced by making the relatively stiff outer breaker ply of a width no wider than the width of the road contacting surface of the tread and the relatively flexible inner breaker ply of a width greater than the width of said road contacting surface.

Accordingly, it is an object of this invention to provide a new and improved radial tire construction and, particularly, one embodying an improved breaker construction.

It is a further object of this invention to provide a radial tire employing metallic wires in the breaker thereof, but having improved resistance to failure by separation of the breaker from the carcass.

Other objects and advantages of the present invention will become apparent from the following description when read in conjunction with the accompanying drawings wherein, FIG. 1 is a schematic radial cross-sectional view of a tire embodying the invention.

FIG. 2 is a diagrammatic view of the breaker plies in the tire of FIG. 1 showing the relative widths of the plies and the arrangements of the strands in each ply.

Referring now to the drawings wherein like reference numerals denote identical elements throughout the several views, FIG. 1 depicts schematically and in cross-section the invention as applied to a monoply radial tire 10. The carcass 11 of this tire 10 comprises a single ply 12 of weftless tire cord fabric having, generally, a zero degree bias angle, that is, each strand or cord 13 in the single body ply lies in a single radial cross-section of the tire 10. While the example shown is that of a monoply radial tire, the invention is also useful, as previously noted, in radial tire constructions employing two or more body plies.

Encircling the carcass 11 is a tread 14 having a road contacting surface 15 which is limited laterally by the shoulders 16 of the tire 10.

Interposed between the carcass 11 and the tread 14 is a breaker 17 comprised of an inner breaker layer 18 lying adjacent the carcass 11 and an outer breaker layer 19 lying adjacent the tread 14. It should be appreciated that, in certain types of tire constructions, spacer or filler strips of rubber are applied between the carcass and the breaker particularly in the tread shoulder region of the tire. Such constructions are intended to be included in the expression "lying adjacent."

Referring now to both FIGS. 1 and 2, in the example shown, the outer breaker layer 19 is comprised of a single breaker ply of weftless steel wire fabric while the inner breaker layer 18 is comprised of a single ply of non-metallic weftless tire cord fabric. The strands or wires 20 of the outer breaker layer 19 are characterized as being stronger and less flexible than the strands or cords 21 of the inner breaker layer 18. Further, in a preferred form of the invention as illustrated, the wires 20 of the outer breaker layer 19 and the cords 21 of the inner breaker layer 18 are oppositely disposed at small angles, $\beta$ and $\alpha$ respectively, with respect to the crown centerline X—X of the tire 10, the preferred bias angle $\beta$ for the outer layer wires 20 being in the range of from two degrees to eighteen degrees, and the preferred range for the bias angle $\alpha$ of the inner layer cords 21 being zero degrees to twenty degrees. Also, as shown in the drawings, it has been found preferable, in accordance with the practice of the invention, to employ an outer, less flexible breaker layer 19 having a width no wider than the road contacting surface 15 of the tread 14, while employing a more flexible inner breaker layer 18 having a width wider than the road contacting surface 15.

It should be noted that in heavier tire constructions each breaker layer may be comprised of more than one ply of fabric provided that the above stated relationships between the two breaker layers 18 and 19 are maintained.

From the foregoing, it is believed that the invention will be readily comprehended by those skilled in the art. It is clearly to be understood, however, that various changes in the construction of the tire as outlined above may be resorted to without departing from the spirit of the invention as defined by the appended claims.

Having thus described my invention, what I claim and desire to protect by Letters Patent is:

1. A pneumatic tire including:
   (a) a carcass comprised of at least one body ply of substantially radially oriented cords;
   (b) a tread exterior to said carcass; and
   (c) a breaker interposed between said carcass and said tread, said breaker being comprised of an inner breaker layer lying adjacent said carcass and an outer breaker layer lying adjacent said tread, each of said layers being comprised of at least one breaker ply of weftless tire cord fabric having substantially circumferentially oriented cords;
   (d) the cords of said outer breaker layer being less flexible than the cords of said inner breaker layer.

2. The tire of claim 1 wherein said inner breaker layer is wider than the road contacting surface of said tread while said outer breaker layer is no wider than said road contacting surface.

3. The tire of claim 1 wherein said outer breaker layer is comprised of at least one breaker ply of weftless steel wire fabric and said inner breaker layer is comprised of at least one breaker ply of weftless non-metallic fabric.

4. The tire of claim 3 wherein said inner breaker layer is wider than the road contacting surface of said tread while said outer breaker layer is no wider than said road contacting surface.

5. A pneumatic tire including:
   (a) a carcass comprised of at least one body ply of substantially radially oriented cords;
   (b) a tread exterior to said carcass; and
   (c) a breaker interposed between said carcass and said tread, said breaker consisting of an inner breaker layer lying adjacent said carcass and an outer breaker layer lying adjacent said tread, each of said layers consisting of at least one breaker ply of weftless tire cord fabric having substantially circumferentially oriented cords;
   (d) the cords of said inner breaker layer being more flexible than the cords of said outer breaker layer.

6. The tire of claim 5 wherein said outer breaker layer consists of at least one breaker ply of weftless steel wire fabric and said inner breaker layer consists of at least one breaker ply of weftless nonmetallic fabric.

7. A pneumatic tire including:
   (a) a carcass comprised of at least one body ply of substantially radially oriented cords;
   (b) a tread exterior to said carcass; and
   (c) a breaker interposed between said carcass and said tread, said breaker consisting of an inner breaker layer adjacent said carcass and an outer breaker layer adjacent said tread, each of said layers consisting of a plurality of breaker plies of weftless tire cord fabric having substantially circumferentially oriented cords, each ply of each said breaker layer being substantially equal in width to each other ply of the same layer;
   (d) the cords of said inner breaker layer being more flexible than the cords of said outer breaker layer;
   (e) said inner breaker layer being wider than the road contacting surface of said tread and said outer breaker layer being no wider than said road contacting surface.

8. The tire of claim 7 wherein the plies of said outer breaker layer are of weftless steel wire fabric and the plies of said inner breaker layer are of weftless non-metallic fabric.

9. A pneumatic tire including:
   (a) a carcass comprised of at least one body ply of substantially radially oriented cords;
   (b) a tread exterior to said carcass; and
   (c) a two-ply breaker interposed between said carcass and said tread, said breaker consisting of an inner breaker ply of weftless tire cord fabric lying adjacent to said carcass and an outer breaker ply of weftless tire cord fabric lying adjacent to said tread, the cords in said respective breaker plies being disposed at opposite small angles with respect to the crown centerline of the tire;
   (d) the cords of the inner breaker ply being more flexible than the cords of the outer breaker ply.

10. The tire of claim 9 wherein said inner breaker ply is wider than the road contacting surface of said tread while said outer breaker ply is no wider than said contacting surface.

11. The tire of claim 9 wherein said outer breaker ply comprises weftless steel wire fabric and said inner breaker ply comprises weftless non-metallic fabric.

12. The tire of claim 10 wherein said outer breaker ply comprises weftless steel wire fabric and said inner breaker ply comprises weftless non-metallic fabric.

References Cited by the Examiner

UNITED STATES PATENTS

| 3,095,026 | 6/1963 | Weber | 152—355 |
| 3,095,027 | 6/1963 | Weber | 152—355 |
| 3,126,042 | 3/1964 | Cegnar | 152—361 |

FOREIGN PATENTS

| 787,705 | 12/1957 | Great Britain. |
| 855,662 | 12/1960 | Great Britain. |

ARTHUR L. LA POINT, *Primary Examiner.*